(12) United States Patent
Kuzusako et al.

(10) Patent No.: US 8,454,879 B2
(45) Date of Patent: Jun. 4, 2013

(54) OPTICAL SHAPING APPARATUS AND OPTICAL SHAPING METHOD

(75) Inventors: Junichi Kuzusako, Saitama (JP);
Nobuhiro Kihara, Kanagawa (JP);
Katsuhisa Honda, Kanagawa (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 12/326,343

(22) Filed: Dec. 2, 2008

(65) Prior Publication Data
US 2009/0142436 A1 Jun. 4, 2009

(30) Foreign Application Priority Data

Dec. 3, 2007 (JP) ................................. 2007-312025

(51) Int. Cl.
*B29C 35/08* (2006.01)

(52) U.S. Cl.
USPC ........... 264/401; 264/497; 264/482; 425/174; 425/174.4; 425/375

(58) Field of Classification Search
USPC ............... 264/401, 497, 482; 425/174, 174.4, 425/375
See application file for complete search history.

(56) References Cited

U.S. PATENT DOCUMENTS

| | | | | |
|---|---|---|---|---|
| 5,058,988 A | * | 10/1991 | Spence | 356/121 |
| 5,106,288 A | * | 4/1992 | Hughes | 425/174.4 |
| 5,229,872 A | * | 7/1993 | Mumola | 349/2 |
| 5,820,795 A | * | 10/1998 | Takemori et al. | 425/174.4 |
| 6,051,179 A | * | 4/2000 | Hagenau | 264/401 |
| 6,717,106 B2 | * | 4/2004 | Nagano et al. | 219/121.83 |
| 6,833,234 B1 | | 12/2004 | Bloomstein | |
| 2008/0157412 A1 | * | 7/2008 | Kihara et al. | 264/1.1 |
| 2008/0169587 A1 | * | 7/2008 | Kihara et al. | 264/408 |

FOREIGN PATENT DOCUMENTS

| | | | |
|---|---|---|---|
| EP | 0 406 513 A1 | | 1/1991 |
| JP | 05-077323 | | 3/1993 |
| JP | 2008155480 A | * | 7/2008 |
| JP | 2008162188 A | * | 7/2008 |

OTHER PUBLICATIONS http://en.wikipedia.org/wiki/Polarizer.*
European Search Report dated Jan. 26, 2009.

* cited by examiner

*Primary Examiner* — Timothy Kennedy
(74) *Attorney, Agent, or Firm* — SNR Denton US LLP (57) ABSTRACT

An optical shaping apparatus includes: an exposing unit for turning on/off irradiation of light to a hardening resin surface for each predetermined unit area to irradiate light collectively on multiple the unit areas with irradiation of light being on; and a scanning unit for irradiating an optical beam with a predetermined diameter to scan the optical beam on the hardening resin surface; with the exposing unit irradiating the light in an area offset by a predetermined number of unit areas toward the inner side than the unit areas overlapped with the profile line of the cross-sectional-shaped data on the hardening resin surface; and with the scanning unit scanning an optical beam having a first diameter along a center line offset from the profile line of the cross-sectional-shaped data, and scanning an optical beam having a second diameter shorter than the first diameter along the inner side of the profile line.

5 Claims, 5 Drawing Sheets

FIG. 4 ially, whereby a three-dimensional model of which the out-
OPTICAL SHAPING APPARATUS AND OPTICAL SHAPING METHOD

CROSS REFERENCES TO RELATED APPLICATIONS

The present invention contains subject matter related to Japanese Patent Application JP 2007-312025 filed in the Japanese Patent Office on Dec. 3, 2007, the entire contents of which are incorporated herein by reference.

BACKGROUND OF THE INVENTION

1. Field of the Invention

The present invention relates to an optical shaping apparatus and optical shaping method, and particularly, relates to an optical shaping apparatus and optical shaping method whereby high-precision optical shaping can be performed.

2. Description of the Related Art

Heretofore, when employing three-dimensional shape data created with CAD (Computer Aided Design) to create a three-dimensional model, for example, a machining device or the like which is numerically-controlled is employed to create a three-dimensional model by machining.

Also, in recent years, a technique called rapid prototyping (RP) for creating a three-dimensional model without performing machining has caught attention in a great number of manufacturing fields. With rapid prototyping, a manufacturing technique called a layering shaping method is employed wherein cross-sectional shaped thin plates are created by a three-dimensional model being sliced based on the three-dimensional shape data of the three-dimensional model, and the cross-sectional shaped thin plates thereof are layered, thereby creating a three-dimensional model.

Also, according to this technique for creating cross-sectional shaped thin plates, rapid prototyping is classified into optical shaping employing an ultraviolet hardening resin, a method for extrusion-layering thermoplastic resins (FDM), a powder melt adhesion layering method (SLS), a paper thin-film layering method (LOM), a method for discharge-layering powder or hardening catalyst (Ink-Jet method), and so forth.

For example, with optical shaping, the tree-dimensional shape data of a three-dimensional model created by CAD is transformed into STL (Stereo Lithography) which is a format wherein the surface of the three-dimensional model is expressed with a small triangle face, and is input to an optical shaping apparatus.

The optical shaping apparatus generates cross-sectional shape data wherein the three-dimensional model is sliced with a certain interval of, for example, around 0.1 through 0.2 mm, from the three-dimensional shape data, and determines an exposure area of light to be irradiated on the surface of a liquid light hardening resin according to the generated cross-sectional shape data. The optical shaping apparatus irradiates light of the exposure area corresponding to the cross-sectional shape data thereof on the surface of the liquid light hardening resin for each layer of the cross-sectional shape data, and moves a moving trestle within the liquid light hardening resin downward in the vertical direction according to the thickness of the slices of the three-dimensional model. Subsequently, the optical shaping apparatus repeats irradiation of light and movement of the moving trestle from the lowermost layer to the uppermost layer of the cross-sectional shape data, thereby generating a three-dimensional model.

With the optical shaping apparatus, examples of a method for irradiating light on the surface of the light hardening resin include a beam scanning method for scanning an optical beam, an SLM projecting method for employing a spatial light modulator (SLM) such as a liquid crystal panel or the like to irradiate light collectively, and a method for combining the beam scanning method and SLM projecting method.

With the method for combining the beam scanning method and SLM projecting method, a spatial light modulator is employed, an optical beam is scanned along the profile line of cross-sectional shape data after light is irradiated on the exposure areas on the surface of a light hardening resin correctively, whereby a three-dimensional model of which the outline is formed finely over a short amount of time can be shaped.

Now, with Japanese Unexamined Patent Application Publication No. 5-77323, an optical shaping apparatus has been disclosed, whereby a gap between a mirror for scanning an optical beam and the surface of a light hardening resin can be adjusted according to the size of a three-dimensional model.

SUMMARY OF THE INVENTION

Incidentally, with the method for combining the beam scanning method and SLM projecting method such as described above, there has been a case wherein a liquid light hardening resin is sometimes remained in a gap between a light hardening resin hardened with one-shot exposure, and a light hardening resin hardened by beam scanning, and dimensional precision deteriorates by such a light hardening resin thereof being post-hardened. Accordingly, it has been difficult to perform high-precision optical shaping.

There has been recognized demand for enabling a high-precision optical shaping to be performed.

With an optical shaping apparatus according to an embodiment of the present invention, an optical shaping apparatus configured to irradiate light according to the cross-sectional shape data of a three-dimensional model on the surface of a light hardening resin to form a hardening layer, and layer the hardening layer to shape the three-dimensional model, includes: a one-shot exposing unit configured to turn on/off irradiation of light to the surface of the light hardening resin for each predetermined unit area, and irradiate light collectively on a plurality of the unit areas of which irradiation of light is on; and a scanning exposing unit configured to irradiate an optical beam with a predetermined diameter, and scan the optical beam on the surface of the light hardening resin; with the one-shot exposing unit irradiating the light in an area which is offset by a predetermined number of unit areas toward the inner side than the unit areas overlapped with the profile line of the cross-sectional shape data on the surface of the light hardening resin; with the scanning exposing unit scanning the optical beam having a first diameter with a center line which is offset to the inner side by predetermined distance from the profile line of the cross-sectional shape data as the center; and with the scanning exposing unit scanning an optical beam having a second diameter which is shorter than the first diameter along the inner side of the profile line of the cross-sectional shape data.

With an optical shaping method according to an embodiment of the present invention, an optical shaping method for an optical shaping apparatus configured to irradiate light according to the cross-sectional shape data of a three-dimensional model on the surface of a light hardening resin to form a hardening layer, and layer the hardening layer to shape the three-dimensional model, wherein the optical shaping apparatus includes a one-shot exposing unit configured to turn on/off irradiation of light to the surface of the light hardening resin for each predetermined unit area, and irradiate light collectively on a plurality of the unit areas of which irradiation of light is on, and a scanning exposing unit configured to irradiate an optical beam with a predetermined diameter, and scan the optical beam on the surface of the light hardening resin, includes the steps of: causing the one-shot exposing unit to irradiate the light in an area which is offset by a predetermined number of unit areas toward the inner side than the unit areas overlapped with the profile line of the cross-sectional shape data on the surface of the light hardening resin; causing the scanning exposing unit to scan the optical beam having a first diameter with a center line which is offset to the inner side by predetermined distance from the profile line of the cross-sectional shape data as the center; and causing the scanning exposing unit to scan an optical beam having a second diameter which is shorter than the first diameter along the inner side of the profile line of the cross-sectional shape data.

According to the above configurations, the optical shaping apparatus includes: a one-shot exposing unit configured to turn on/off irradiation of light to the surface of the light hardening resin for each predetermined unit area, and irradiate light collectively on the multiple unit areas of which irradiation of light is on; and a scanning exposing unit configured to irradiate an optical beam with a predetermined diameter, and scan the optical beam on the surface of the light hardening resin. The one-shot exposing unit irradiates the light in an area which is offset by a predetermined number of unit areas toward the inner side than the unit areas overlapped with the profile line of the cross-sectional shape data on the surface of the light hardening resin. The scanning exposing unit scans the optical beam having a first diameter with a center line which is offset to the inner side by predetermined distance from the profile line of the cross-sectional shape data as the center, and scans an optical beam having a second diameter which is shorter than the first diameter along the inner side of the profile line of the cross-sectional shape data.

Thus, according to the above configurations, high-precision optical shaping can be performed.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

An optical shaping apparatus according to an embodiment of the present invention is an optical shaping apparatus configured to irradiate light according to the cross-sectional shape data of a three-dimensional model on the surface of a light hardening resin to form a hardening layer, and layer the hardening layer to shape the three-dimensional model, including: a one-shot exposing unit configured to turn on/off irradiation of light to the surface of the light hardening resin for each predetermined unit area, and irradiate light collectively on a plurality of the unit areas of which irradiation of light is on (e.g., one-shot exposure optical system 12 in FIG. 2); and a scanning exposing unit configured to irradiate an optical beam with a predetermined diameter, and scan the optical beam on the surface of the light hardening resin (e.g., beam scanning optical system 13 in FIG. 2); with the one-shot exposing unit irradiating the light in an area which is offset by a predetermined number of unit areas toward the inner side than the unit areas overlapped with the profile line of the cross-sectional shape data on the surface of the light hardening resin; with the scanning exposing unit scanning the optical beam having a first diameter with a center line which is offset to the inner side by predetermined distance from the profile line of the cross-sectional shape data as the center; and with the scanning exposing unit scanning an optical beam having a second diameter which is shorter than the first diameter along the inner side of the profile line of the cross-sectional shape data.

Figure 5:
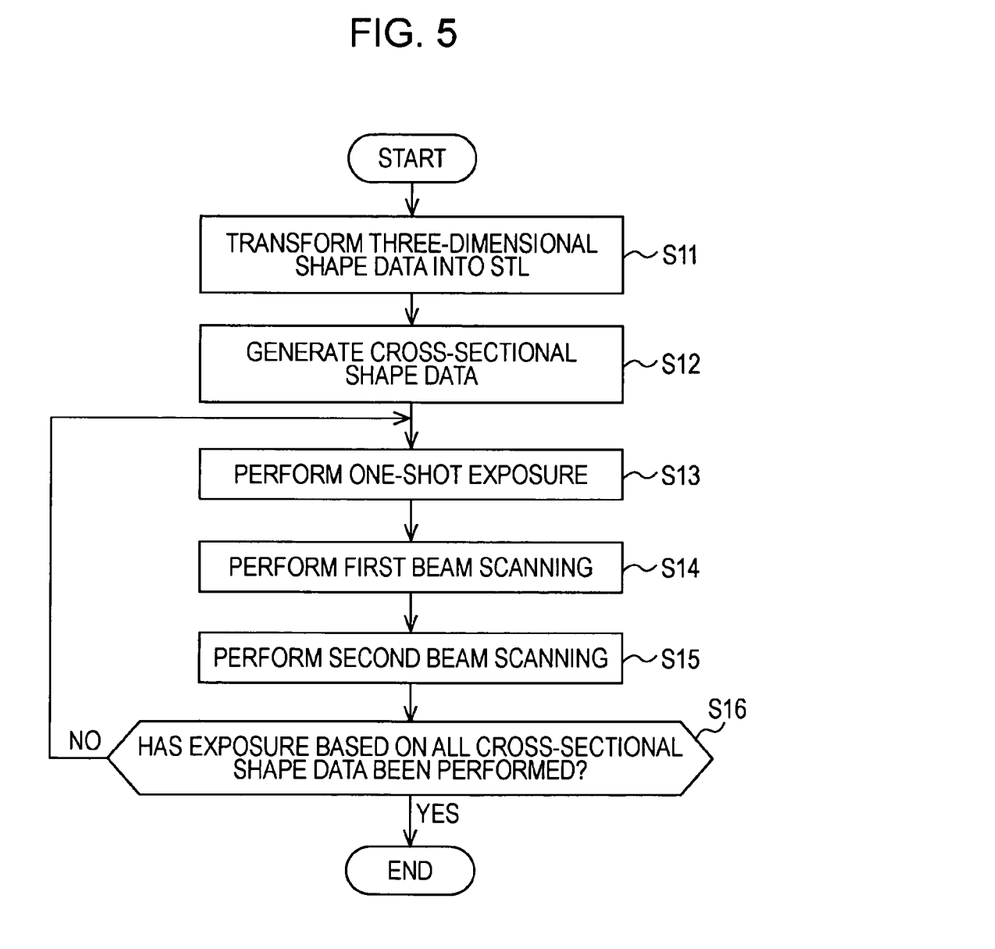
FIG. 5 is a flowchart for describing processing for performing optical shaping according to the optical shaping apparatus 11.

An optical shaping method according to an embodiment of the present invention is an optical shaping method for an optical shaping apparatus configured to irradiate light according to the cross-sectional shape data of a three-dimensional model on the surface of a light hardening resin to form a hardening layer, and layer the hardening layer to shape the three-dimensional model, wherein the optical shaping apparatus includes a one-shot exposing unit configured to turn on/off irradiation of light to the surface of the light hardening resin for each predetermined unit area, and irradiate light collectively on a plurality of the unit areas of which irradiation of light is on, and a scanning exposing unit configured to irradiate an optical beam with a predetermined diameter, and scan the optical beam on the surface of the light hardening resin, including the steps of: causing the one-shot exposing unit to irradiate the light in an area which is offset by a predetermined number of unit areas toward the inner side than the unit areas overlapped with the profile line of the cross-sectional shape data on the surface of the light hardening resin (e.g., step S13 in FIG. 5); causing the scanning exposing unit to scan the optical beam having a first diameter with a center line which is offset to the inner side by predetermined distance from the profile line of the cross-sectional shape data as the center (e.g., step S14 in FIG. 5); and causing the scanning exposing unit to scan an optical beam having a second diameter which is shorter than the first diameter along the inner side of the profile line of the cross-sectional shape data (e.g., step S15 in FIG. 5).

Description will be made below in detail regarding specific embodiments to which the present invention has been applied, with reference to the drawings.

First, description will be made regarding a tiling method which is an optical shaping method according to an optical shaping apparatus to which an embodiment of the present invention has been applied with reference to FIG. 1.

In general, with optical shaping, a range for scanning an optical beam, or a range for irradiating light by employing a spatial light modulator is reduced, whereby the outline of a three-dimensional model can be formed with high precision, and accordingly, the dimensional precision of the three-dimensional model can be improved. Therefore, for example, the tiling method has been proposed wherein a work entire area which is a whole area where optical shaping work is performed is divided into multiple work small areas, and one-shot exposure and beam scanning are performed for each of the work small areas.

Figure 1:
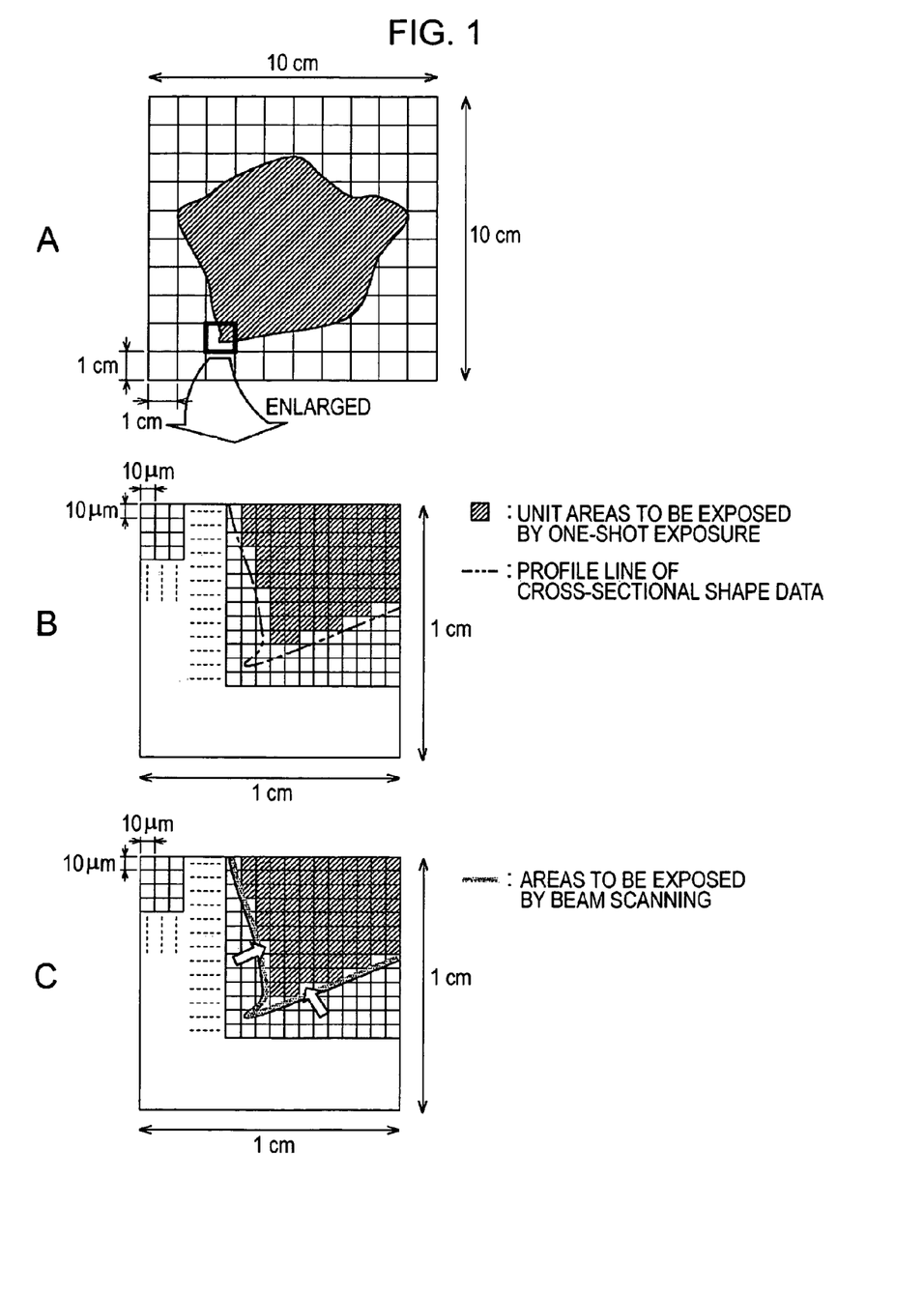
FIG. 1 is a diagram for describing a tiling method.

A work entire area is shown in A in FIG. 1, and a work small area which is a part of the work entire area is shown in B and C in FIG. 1. In FIG. 1, the work entire area is 10 cm by 10 cm, and a work small area is 1 cm by 1 cm. That is to say, the work entire area is divided into 10 by 10 work small areas.

As shown in A in FIG. 1, an area subjected to hatching around the center of the work entire area is an exposure area corresponding to the cross-sectional shape data of a three-dimensional model, and a work small area positioned at the second row from the bottom of this work entire area, and at the third column from the left is enlarged and illustrated in B and C in FIG. 1.

Now, with one-shot exposure, if we say that a spatial light modulator which is 1000 pixels by 1000 pixels is employed, as shown in B in FIG. 1, a work small area is divided into 1000 by 1000 unit areas according to a pixel of the spatial light modulator (i.e., areas corresponding to one pixel of the spatial light modulator). In this case, a work small area is 1 cm by 1 cm, so a unit area is 10 μm by 10 μm.

Also, in B in FIG. 1, the profile line of the cross-sectional shape data is illustrated with a two-dot broken line, and unit areas to be exposed by the one-shot exposure are subjected to hatching. That is to say, with the one-shot exposure, unit areas inside the profile line are exposed, unit areas where the profile line of the cross-sectional shape data is overlapped, and unit areas outside the profile line of the cross-sectional shape data are not exposed.

Subsequently, after the one-shot exposure is performed, as shown in C in FIG. 1, beam scanning is performed along the inner side of the profile line of the cross-sectional shape data.

Incidentally, with optical shaping according to such a tiling method, light is not irradiated on areas where white arrows indicate in C in FIG. 1, so a liquid light hardening resin is remained in a gap between a light hardening resin hardened by the one-shot exposure, and a light hardening resin hardened by the beam scanning. Subsequently, upon the liquid light hardening resin remained in this gap being post-hardened by irradiation of light, distortion or deformation occurs on the three-dimensional model due to contraction caused by the light hardening resin being hardened, and the dimensional precision of the three-dimensional model deteriorates in some cases.

Therefore, with the optical shaping apparatus to which an embodiment of the present invention has been applied, such a light hardening resin is prevented from remaining, thereby improving the dimensional precision of the three-dimensional model.

Figure 2:
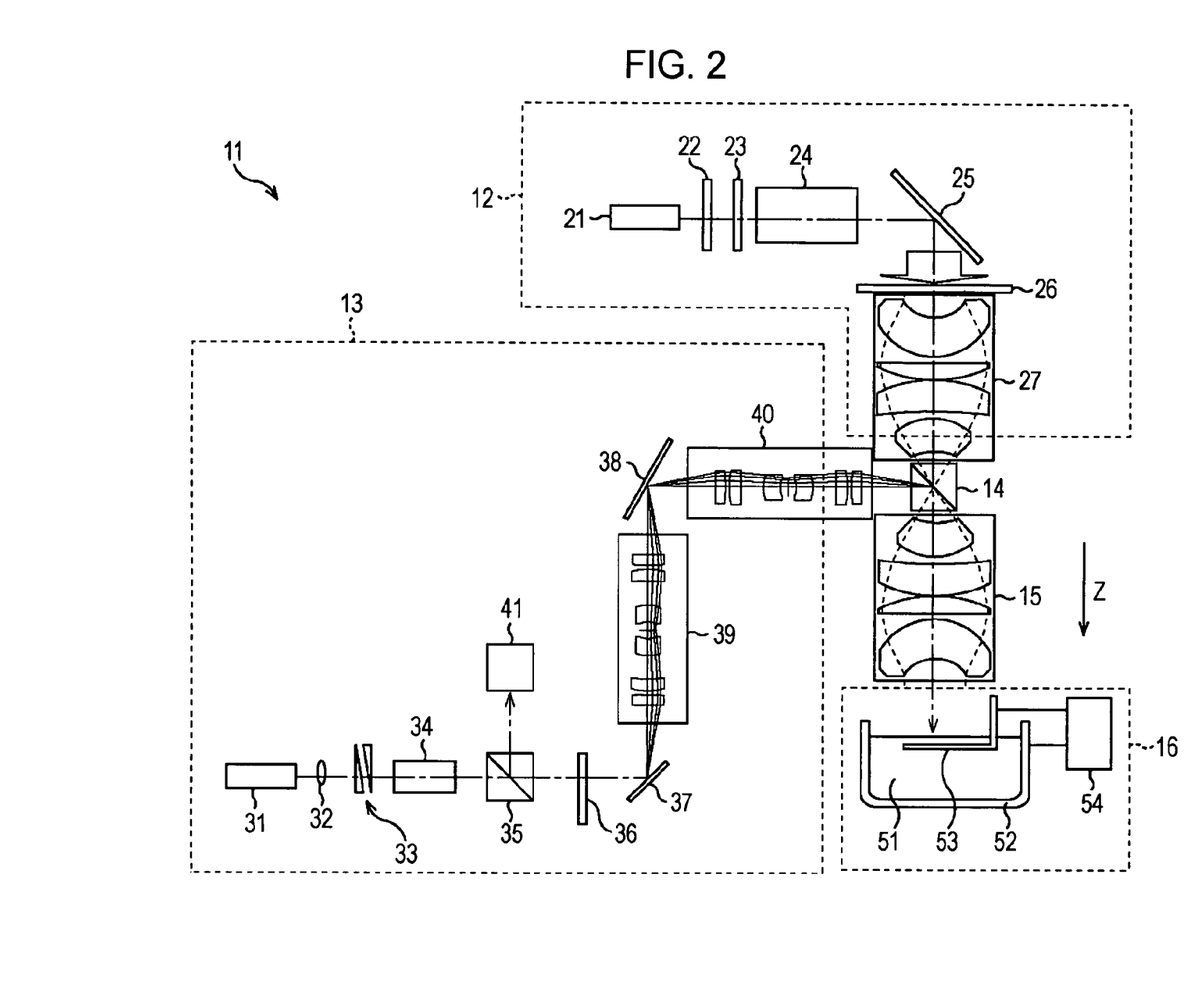
FIG. 2 is a block diagram illustrating a configuration example of an optical shaping apparatus to which an embodiment of the present invention has been applied.

FIG. 2 is a block diagram illustrating a configuration example of an optical shaping apparatus to which an embodiment of the present invention has been applied. In FIG. 2, an optical shaping apparatus 11 is configured of a one-shot exposure optical system 12, beam scanning optical system 13, polarizing beam splitter 14, and an objective lens 15, and work unit 16, and irradiates light (ultraviolet ray) on an ultraviolet hardening resin 51 which is a light hardening resin, thereby performing optical shaping.

The one-shot exposure optical system 12 is an optical system for performing one-shot exposure wherein the surface of the ultraviolet hardening resin 51 within the work unit 16 is exposed collectively, and is configured of a light source 21, shutter 22, polarizing plate 23, beam integrator 24, mirror 25, spatial light modulator 26, and condensing lens 27.

A light source where high-output blue LEDs are disposed in an array fashion can be employed as the light source 12. The light source 12 irradiates light for performing the one-shot exposure. Note that a coherent laser light source does not have to be employed as the light source 12.

The shutter 22 controls passage or shielding of light irradiated from the light source 21, and controls on/off of exposure by the one-shot exposure optical system 12.

The polarizing plate 23 converts the light passed through the shutter 22 into predetermined polarization light. That is to say, the polarizing plate 23 polarizes the light from the light source 21 such that the spatial light modulator 26 made up of a transmissive liquid crystal panel can subject the light from the light source 21 to spatial modulation.

The beam integrator 24 makes uniform the light polarized by the polarizing plate 23. A common type is employed as the beam integrator 24, such as a fly eye type made up of multiple lens elements being arrayed, a light rod type having a configuration wherein the inside of a rod lens in a columnar shape such as a quadratic prism or the like is total-reflected, or the like.

The mirror 25 reflects the light uniformed by the beam integrator 24 toward the spatial light modulator 26. The spatial light modulator 26 is made up of, for example, a transmissive liquid crystal panel, and subjects a part of the light reflected by the mirror 25 to spatial modulation such that the light reflected by the mirror 25 is projected on the ultraviolet hardening resin 51 in a form corresponding to the cross-sectional shape data. That is to say, the spatial light modulator 26 subjects the light passed through to spatial modulation by changing the array of liquid crystal molecules of the pixel to be projected based on a driving signal for driving each pixel of the liquid crystal panel, thereby changing the polarization direction where light transmits, and projecting light corresponding to the cross-sectional shape data on the ultraviolet hardening resin 51.

The condensing lens 27 is configured of a lens group for correcting distortion at the time of the light subjected to spatial modulation by the spatial light modulator 26 passing through the objective lens 15, and condenses the light subjected to spatial modulation by the spatial light modulator 26 on the anterior focal point of the objective lens 15 on the reflecting/transmitting face of the polarizing beam splitter 14. For example, each of the lens groups is configured such that the condensing lens 27 and objective lens 15 make up a symmetric optical system, whereby distortion can be reduced.

The beam scanning optical system 13 is an optical system for scanning a laser beam on the surface of the ultraviolet hardening resin 51 within the work unit 16 to perform the beam scanning exposure, and is configured of a light source 31, collimating lens 32, anamorphic lens 33, beam expander 34, beam splitter 35, shutter 36, galvanometer mirrors 37 and 38, relay lenses 39 and 40, and reflected light monitor unit 41.

The light source 31 is, for example, a semiconductor laser for irradiating a laser beam with a relatively short wavelength from blue to ultraviolet part, and irradiates an optical beam for performing the beam scanning by the beam scanning optical system 13. Note that a gas laser or the like other than a semiconductor laser may be employed as the light source 31.

The collimating lens 32 converts the divergence angle of an optical beam irradiated from the light source 31 into approximate parallel light. The anamorphic lens 33 shapes an elliptical-shaped optical beam converted into approximate parallel light by the collimating lens 32 into an approximate circular shape.

The beam expander 34 converts the beam diameter (the diameter of the beam) of the optical beam shaped to an approximate circular shape by the anamorphic lens 33 into a desired beam diameter suitable for the aperture of the objective lens 15, NA (Numerical Aperture), or the like, thereby performing adjustment in size.

The beam splitter 35 transmits the optical beam irradiated from the light source 31 toward the ultraviolet hardening resin 51 within the work unit 16, and reflects return light passing through each optical system toward the reflected light monitor unit 41.

The shutter 36 controls passage or shielding of the optical beam transmitted through the beam splitter 35, and controls on/off of the beam scanning exposure by the beam scanning optical system 13. Note that when the light source 31 is a semiconductor laser, on/off of the beam scanning exposure can be controlled by directly modulating irradiation of the optical beam at the semiconductor laser, so the beam scanning optical system 13 may be configured without providing the shutter 36.

The galvanometer mirrors 37 and 38 include a reflecting unit capable of rotating in a predetermined direction, and an adjusting unit for adjusting the angle of the rotation direction of the reflecting unit according to an electric signal, and the adjusting unit adjusts the angle of the reflecting unit, thereby scanning the optical beam reflected by the reflecting unit in a predetermined direction.

Specifically, the galvanometer mirror 37 reflects the optical beam transmitted through the shutter 36 toward the galvanometer mirror 38, and scans this in the X direction which is a predetermined one direction within a face parallel to a liquid level which is the surface of the ultraviolet hardening resin 51. The galvanometer mirror 38 reflects the optical beam reflected by the galvanometer mirror 37 toward the polarizing beam splitter 14, and scans this in the Y direction which is a direction orthogonal to the X direction within a face parallel to a liquid level which is the surface of the ultraviolet hardening resin 51.

The relay lenses 39 and 40 are made up of a lens group including a single or multiple lenses, and emit a parallel incident optical beam in parallel over a scanning angle where the optical beam is scanned by the galvanometer mirrors 37 and 38. Specifically, the relay lens 39 image-forms the optical beam reflected at the galvanometer mirror 37 on the galvanometer mirror 38, and the relay lens 40 image-forms the optical beam reflected at the galvanometer mirror 38 on the reflecting/transmitting face of the polarizing beam splitter 14.

Thus, the relay lens 39 is provided between the galvanometer mirrors 37 and 38, and the relay lens 40 is provided between the galvanometer mirror 38 and polarizing beam splitter 14, and thus, even if an optical beam is scanned by the galvanometer mirrors 37 and 38 which are not disposed in adjacent positions, the optical beam can be image-formed on the reflecting/transmitting face of the polarizing beam splitter 14, and can be synthesized with the light from the one-shot exposure optical system 12.

The reflected light monitor unit 41 detects return light reflected at the surface of the ultraviolet hardening resin 51, for example, by employing the astigmatism method or triangulation method. The return light detected by the reflected light monitor unit 41 is employed for adjustment in focusing of the optical beam irradiated on the ultraviolet hardening resin 51 from the beam scanning optical system 13.

The polarizing beam splitter 14 synthesizes the light from the one-shot exposure optical system 12, and the optical beam from the beam scanning optical system 13, and guide these optical beams to the ultraviolet hardening resin 51. Note that with the polarizing beam splitter 14, the reflecting/transmitting face thereof is disposed so as to be identical to the focal position on the front side of the objective lens 15.

The objective lens 15 is made up of a lens group including a single or multiple lenses, image-forms the light from the one-shot exposure optical system 12 on the surface of the ultraviolet hardening resin 51, and condenses the optical beam from the beam scanning optical system 13.

Also, the objective lens 15 is configured such that the optical beam deflected by the galvanometer mirrors 37 and 38 of the beam scanning optical system 13 is scanned at equal speed on the surface of the ultraviolet hardening resin 51, i.e., is scanned at even scanning speed on the surface of the ultraviolet hardening resin 51.

For example, a so-called fθ lens is employed as the objective lens 15, which has an image height Y proportional to an incident angle θ, and a relation (Y=f×θ) wherein a product between a focal length f and the incident angle θ is the image height Y. In other words, the fθ lens is a lens designed such that the scanning speed of an optical beam to be scanned is constant regardless of an incident position to the lens. Such an objective lens 15 is employed, whereby occurrence of difference between a design shape and an actual hardening layer shape due to the irregularities of scanning speed can be prevented, and accordingly, high-definition shaping is realized.

The work unit 16 is configured of a housing container 52, stage 53, and driving unit 54. The housing container 52 houses the liquid ultraviolet hardening resin 51.

The stage 53 is dipped in the liquid ultraviolet hardening resin 51 of the housing container 52, and is configured so as to be movable at least in the vertical direction (direction of an arrow Z in FIG. 2) orthogonal to a liquid level which is the surface of the ultraviolet hardening resin 51. Also, the stage 53 is configured so as to be movable in the direction along the liquid level which is the surface of the ultraviolet hardening resin 51 (i.e., X-Y direction perpendicular to the direction of the arrow Z), and moves in the direction along the surface of the ultraviolet hardening resin 51 (X-Y direction) for each of the work small areas in FIG. 1 in accordance with control of the driving unit 54.

For example, in response to a situation wherein the ultraviolet hardening resin 51 is exposed according to the cross-sectional shape data of a three-dimensional model, and one hardening layer of the three-dimensional model is formed, the driving unit 54 drives the stage 53 downward in the vertical direction step by step. Also, the driving unit 54 drives the housing container 52 in the vertical direction such that the surface of the ultraviolet hardening resin 51 is identical to the rear-side focal position of the objective lens 15.

Next, description will be made regarding optical shaping according to the optical shaping apparatus 11 with reference to FIG. 3. Note that the optical shaping apparatus 11 performs optical shaping by the tiling method as described with reference to FIG. 1, and the same work small areas as those in B and C in FIG. 1 are shown in FIG. 3.

With the optical shaping apparatus 11, according to the one-shot exposure, light is irradiated on a unit area within an area offset by one unit area toward the inner side than the unit area where the profile line of the cross-sectional shape data is overlapped, and subsequently, an optical beam is irradiated by first beam scanning and second beam scanning.

Figure 3:
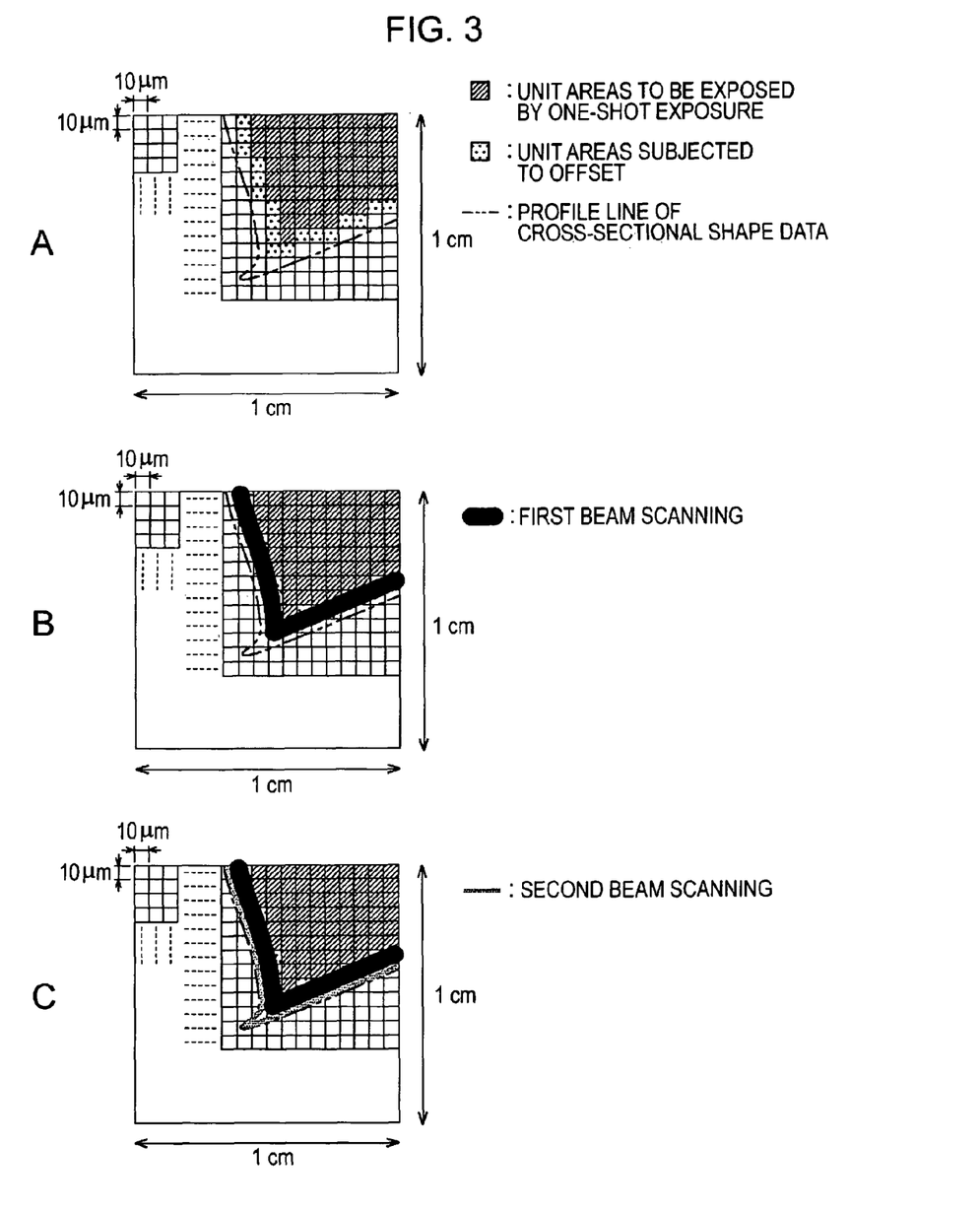
FIG. 3 is a diagram for describing optical shaping according to an optical shaping apparatus 11.

That is to say, in A in FIG. 3, light is irradiated on unit areas subjected to shaded hatching. Note that the unit areas subjected to dotted hatching are unit areas which are offset, where light is irradiated with the one-shot exposure of optical shaping described with FIG. 1, but light is not irradiated with the one-shot exposure according to the optical shaping apparatus 11.

After the one-shot exposure is performed, as shown in B in FIG. 3, an optical beam is irradiated by the first beam scanning. With the first beam scanning, the beam diameter thereof is adjusted by the beam expander 34 of the beam scanning optical system 13 such that the beam diameter thereof is identical to the length of one side of a unit area according to the one-shot exposure. Also, the optical beam according to the first beam scanning is scanned such that the center thereof passes through a line offset to the inner side than the profile line of the cross-sectional shape data (hereafter, referred to as "center line" as appropriate) by distance obtained by adding the radius of the optical beam (i.e., the length of a half of one side of a unit area), and the beam diameter of the optical beam according to the second beam scanning shown in C in FIG. 3.

Specifically, if we say that the length of one side of a unit area according to the one-shot exposure is 10 µm, and the beam diameter of the optical beam according to the second beam scanning is 1.0 µm, the beam diameter of the optical beam according to the first beam scanning is 10 µm, and is scanned with a center line offset to the inner side than the profile line of the cross-sectional shape data by 6 µm as the center. Consequently, the area to be exposed by the first beam scanning, and the profile line of the cross-sectional shape data have an interval of 1.0 µm, i.e., the same interval as the beam diameter of the optical beam according to the second beam scanning.

After the first beam scanning is performed, an optical beam is irradiated by the second scanning. The optical beam according to the second beam scanning is scanned so as to be along the inner side of the profile line of the cross-sectional shape data.

Specifically, if we say that the beam diameter of the optical beam according to the second beam scanning is 1.0 µm, the optical beam according to the second beam scanning is scanned such that the center thereof passes through a line offset to the inner side than the profile line of the cross-sectional shape data by 0.5 µm (i.e., the radius of the optical beam according to the second beam scanning). As described above, the area to be exposed by the first beam scanning, and the profile line of the cross-sectional shape data have the same interval as the beam diameter of the optical beam according to the second beam scanning, so the area of the interval thereof is exposed by the second beam scanning.

Thus, the first beam scanning and second beam scanning are performed, such as described with reference to FIG. 1, liquid light hardening resin can be prevented from remaining between the light hardening resin hardened by the one-shot exposure, and the light hardening resin hardened by the beam scanning.

Specifically, the optical beam according to the first beam scanning is scanned such that the beam diameter thereof is identical to the length of one side of a unit area according to the one-shot exposure, and passes through a center line such as described above, whereby occurrence of a gap between the area to be exposed by the one-shot exposure, and the area to be exposed by the first beam scanning can be prevented, or occurrence of a gap can be reduced as much as possible. Thus, occurrence of an area where no light is irradiated can be prevented, and a liquid light hardening resin can be prevented from remaining.

Also, the center line of the optical beam according to the first beam scanning is set such that the interval between the optical beam according to the first beam scanning, and the profile line of the cross-sectional shape data is identical to the beam diameter of the optical beam according to the second beam scanning, so no gap occurs between the area to be exposed by the first beam scanning, and the area to be exposed by the second beam scanning. Also, the outer circumference of the area to be exposed by the second beam scanning is formed so as to be overlapped with the profile line of the cross-sectional shape data.

Thus, liquid light hardening resin is prevented from remaining between the light hardening resin hardened by the one-shot exposure, and the light hardening resin hardened by the first beam scanning, and between the light hardening resin hardened by the first beam scanning, and the light hardened by the second beam scanning.

Also, the second beam scanning is performed, whereby a higher precision three-dimensional model can be shaped as compared to the case of the first beam scanning alone being performed. Specifically, the beam diameter of the optical beam according to the second beam scanning is finer than the beam diameter of the optical beam according to the first beam scanning, so for example, with regard to a protruding shape such as shown in FIG. 3, it is difficult to expose the tip thereof by only the optical beam according to the first beam scanning, but the tip thereof can be exposed by the optical beam according to the second beam scanning. For example, the optical beam according to the second beam scanning is set to the beam diameter of 1.0 µm, whereby a three-dimensional model of around several tens of µm can be shaped with high precision.

Each unit of the optical shaping apparatus 11 for performing such optical shaping is controlled, for example, by a computer embedded in the optical shaping apparatus 11.

Figure 4:
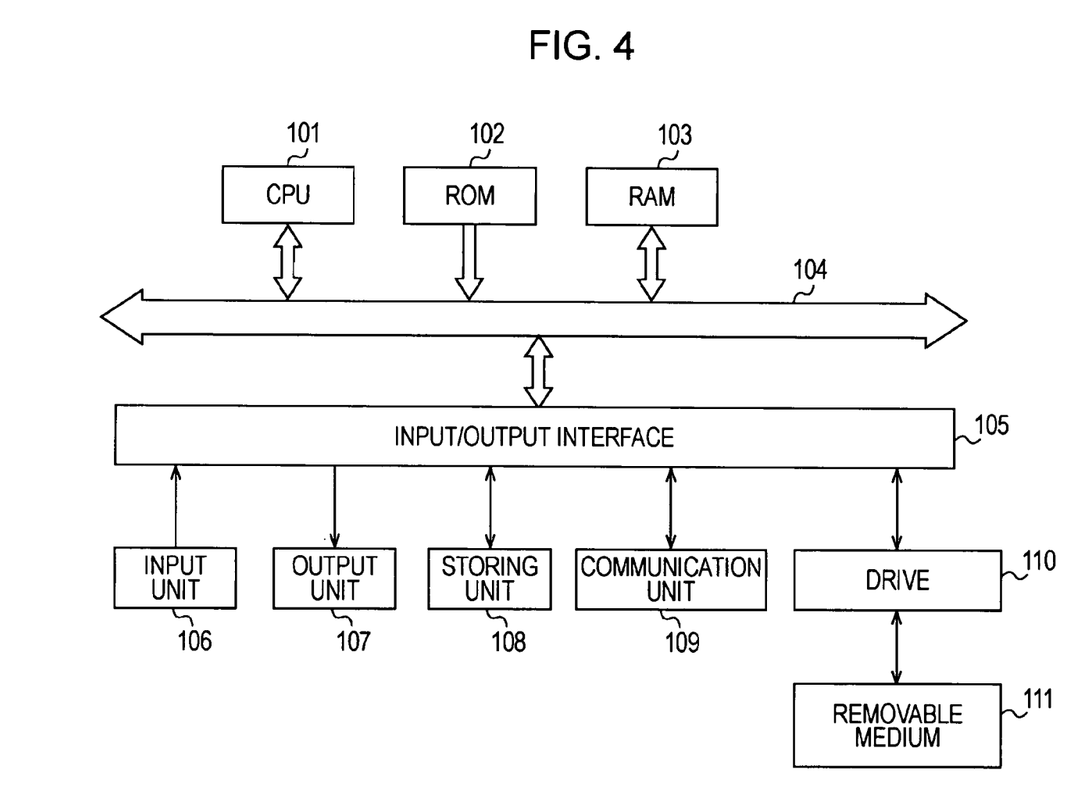
FIG. 4 is a block diagram illustrating a configuration example of a computer according to an embodiment for controlling each unit of the optical shaping apparatus 11.

Specifically, FIG. 4 is a block diagram illustrating a configuration example of a computer according to an embodiment for controlling each unit of the optical shaping apparatus 11. With the computer in FIG. 4, a CPU (Central Processing Unit) 101, ROM (Read Only Memory) 102, and RAM (Random Access Memory) 103 are connected mutually by a bus 104.

An input/output interface 105 is further connected to the bus 104. The input/output interface 105 is connected with an input unit 106 made up of a keyboard, mouse, microphone and so forth, an output unit 107 made up of a display, speaker, and so forth, a storing unit 108 made up of a hard disk, nonvolatile memory, and so forth, a communication unit 109 made up of a network interface and so forth, and a drive 110 for driving a removable medium 111 such as a magnetic disk, optical disc, magneto-optical disk, semiconductor memory, or the like.

The storing unit 108 stores, for example, a program for converting the three-dimensional shape data of a three-dimensional model generated by CAD into STL, a program for generating the cross-sectional shape data of a three-dimensional model from the three-dimensional shape data converted into STL, or a program for controlling the one-shot exposure optical system 12 and beam scanning optical system 13 based on the cross-sectional shape data of a three-dimensional model.

With such a computer, the CPU 101 loads, for example, a program stored in the storing unit 108 in the RAM 103 through the input/output interface 105 and bus 104, and executes this, which causes the optical shaping apparatus 11 to execute optical shaping by controlling each unit of the optical shaping apparatus 11 through the communication unit 109.

Next, FIG. 5 is a flowchart for describing processing for performing optical shaping according to the optical shaping apparatus 11. For example, upon three-dimensional shape data of a three-dimensional model created by CAD being input to the optical shaping apparatus 11, and operations for starting optical shaping being performed, in step S11 the CPU 101 reads out and executes the program stored in the storing unit 108 to transform the three-dimensional shape data of the three-dimensional model into STL.

After the processing in step S11, the processing proceeds to step S12, where the CPU 101 generates the cross-sectional shape data of the three-dimensional model from the three-dimensional shape data transformed into STL, and the processing proceeds to step S13. Also, when generating the cross-sectional shape data of a three-dimensional model, for example, the attitude and orientation of the three-dimensional model are determined, and data for shaping a member for preventing the three-dimensional model from falling during shaping, and so forth are generated.

In step S13, the CPU 101 controls the spatial light modulator 26 such that spatial modulation is performed according to a unit area to be exposed (i.e., as described with reference to FIG. 3, a unit area included in an area offset to the inner side than a unit area where the profile line of the cross-sectional shape data of the three-dimensional model is overlapped) based on data at the first layer of the cross-sectional shape data generated in step S12, opens the shutter 22 by a predetermined exposure period to expose the ultraviolet hardening resin 51. Here, with the optical shaping apparatus 11, optical shaping is performed by the tiling method, so in step S13, all of the work small areas of the work entire area (see A in FIG. 1) are subjected to the one-shot exposure sequentially.

After the processing in step S13, the processing proceeds to step S14, where the CPU 101 controls the beam expander 34 such that the beam diameter of the optical beam irradiated from the light source 31 becomes a first beam diameter (e.g., 10 μm), opens the shutter 36, and controls the galvanometer mirrors 37 and 38 such that the first beam scanning based on the first layer data of the cross-sectional shape data is performed. After the processing in step S14, the processing proceeds to step S15.

In step S15, the CPU 101 controls the beam expander 34 such that the beam diameter of the optical beam irradiated from the light source 31 becomes a second beam diameter (e.g., 1.0 μm), opens the shutter 36, and controls the galvanometer mirrors 37 and 38 such that the second beam scanning based on the first layer data of the cross-sectional shape data is performed.

After the processing in step S15, the processing proceeds to step S16, where the CPU 101 determines whether or not exposure based on the cross-sectional shape data generated in step S12 (one-shot exposure, and first and second beam scanning exposures) has been performed.

In a case wherein in step S16 the CPU 101 has determined that exposure based on all of the cross-sectional shape data has not been performed, the processing returns to step S13, where the same processing is repeated with the cross-sectional shape data of the next layer of the layer wherein exposure is performed in the last steps S13 through S15 as a processing target.

On the other hand, in a case wherein in step S16 the CPU 101 has determined that exposure based on all of the cross-sectional shape data has been performed, the three-dimensional model is completed, and the processing is ended.

As described above, with the optical shaping apparatus 11, after the one-shot exposure according to the one-shot exposure optical system 12 is performed, the exposure according to the first and second beam scanning is performed by the beam scanning optical system 13, so liquid light hardening resin can be prevented form remaining, as described with reference to FIG. 3.

Accordingly, with the three-dimensional model shaped by the optical shaping apparatus 11, neither distortion nor deformation due to post-hardening occurs, so the optical shaping apparatus 11 can perform high-precision optical shaping.

Also, the optical shaping apparatus 11 irradiates an optical beam in the vicinity of the outline of the three-dimensional model twice, whereby the strength in the vicinity of the outline of the three-dimensional model can be improved, e.g., the surface of the three-dimensional model can be prevented from peeling off.

A microchip, connector, microcapsule, or the like, or a prototype of various types of fine component can be shaped by employing such an optical shaping apparatus 11.

Note that, with the present embodiment, the fθ lens has been employed as the objective lens 15, but a lens having a common condensing function may be employed as the objective lens 15. In this case, the rotation speed of the galvanometer mirrors 37 and 38 is controlled, thereby configuring the beam scanning optical system 13 such that an optical beam is scanned at uniform scanning speed. Also, a polygon mirror or the like other than the galvanometer mirrors 37 and 38 may be employed as a unit for scanning an optical beam.

Further, in addition to a transmissive liquid crystal panel, a digital micromirror device (DMD) made up of multiple minute reflection mirrors being arrayed wherein the tilt angle is changed according to an input signal, reflective liquid crystal on silicon (LCOS), or the like may be employed as the spatial light modulator 26. In the case of employing a digital micromirror device, each micromirror corresponds to one unit area, so the one-shot exposure optical system 12 can be configured without providing the polarizing plate 23.

Note that a unit area offset toward the inner side than a unit area where the profile line of the cross-sectional shape data is overlapped is not restricted to a single unit area, two or three or more unit areas may be offset. In this case, the beam diameter of the first beam scanning is a value obtained by multiplying the length of one side of a unit area according to the one-shot exposure by the number of unit areas which are offset. For example, in a case wherein two unit areas are offset, the beam diameter of the first beam scanning is 20 μm, and the center line thereof is a line offset to the inner side than the profile line of the cross-sectional shape data by 11 μm (value obtained by adding the radius of the beam diameter of the first beam scanning, and the beam diameter of the optical beam according to the second beam scanning).

Also, the present invention may be applied to not only the optical shaping apparatus 11 for performing optical shaping by a free liquid level method which is a technique wherein the light from the one-shot exposure optical system 12 and beam scanning optical system 13 is irradiated from above the ultraviolet hardening resin 51, but also an optical shaping apparatus for performing optical shaping by a fluid surface regulation method which is a technique wherein the light from the one-shot exposure optical system 12 and beam scanning optical system 13 is irradiated on the interface between the ultraviolet hardening resin 51 and housing container 52.

For example, the bottom face of the housing container 52 is configured of a material for transmitting light, such as glass or the like, and the light from the one-shot exposure optical system 12 and beam scanning optical system 13 is irradiated on the interface between the glass thereof and ultraviolet hardening resin 51 from the lower portion of the ultraviolet hardening resin 51. That is to say, the surface of the ultraviolet hardening resin 51 where light corresponding to the cross-sectional shape data of a three-dimensional model is irradiated includes the interface between the glass and ultraviolet hardening resin 51.

With the fluid surface regulation method, processing is repeated wherein the stage 53 is disposed such that the distance between the housing container 52 and stage 53 is equal to the thickness of one layer worth of hardening layers, and the stage 53 is driven upward in the vertical direction such that the distance between the housing container 52 and stage 53 is equal to the thickness of one layer worth of hardening layers step by step in response to one hardening layer of a three-dimensional model being formed according to light irradiated on the ultraviolet hardening resin 51 through the glass of the bottom face of the housing container 52, thereby forming the three-dimensional model.

Thus, the surface (interface) of the ultraviolet hardening resin 51 where light is irradiated is regulated by glass, thereby shaping the thickness of one layer worth of hardening layers accurately, so layering precision can be improved, and thus, a three-dimensional model can be formed with high precision.

Also, the program executed by the computer (CPU 101) in FIG. 4 is provided by being recorded in the removable medium 111 which is a package medium made up of a magnetic disk (including a flexible disk), optical disc (CD-ROM (Compact Disc-Read Only Memory), DVD (Digital Versatile Disc), etc.), magneto-optical disk, semiconductor memory, or the like, or provided through a cable or wireless transmission medium such as a local area network, the Internet, or digital satellite broadcasting.

Subsequently, the removable medium 111 is mounted on the drive 110, whereby the program can be installed in the storing unit 108 through the input/output interface 105. Also, the program can be received at the communication unit 109 through a cable or wireless transmission medium, and installed in the storing unit 108. Alternatively, the program can be installed in the ROM 102 or storing unit 108 beforehand.

Also, each processing described with reference to the above-mentioned flowchart does not have to be processed in time sequence along the order described in the flowchart, and includes processing to be executed in parallel or individually (e.g., parallel processing or processing according to an object). Alternatively, the program may be processed by a single CPU, or may be processed by multiple CPUs in a distributed manner.

Note that embodiments of the present invention are not restricted to the above-mentioned embodiment, and various modifications may be made without departing from the essence and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical shaping apparatus configured to irradiate light according to cross-sectional shape data of a three-dimensional model on a surface of a light hardening resin to form a hardening layer, and hardening layers to shape said three-dimensional model, comprising:
    one-shot exposing means for turning on/off irradiation of light onto the surface of said light hardening resin for each predetermined unit area, and irradiating light collectively on a plurality of said unit areas for which irradiation of light is on;
    scanning exposing means configured to irradiate an optical beam with a predetermined diameter, and scan said optical beam on the surface of said light hardening resin;
    a polarizing beam splitter configured to synthesize light from the one-shot exposing means and the optical beam from the scanning exposing means; and
    an objective lens to receive light from the one-shot exposing means and the optical beam from the polarizing beam splitter, the objective lens being configured to (a) image-form light from the one-shot exposing means on the surface of said light hardening resin and (b) condense the optical beam from the scanning exposing means, said objective lens receiving light from the one-shot exposing means before receiving the optical beam from the scanning exposing means,
    wherein,
        said one-shot exposing means includes a condenser lens, said condenser lens and said objective lens comprise a symmetric optical system,
        said one-shot exposing means irradiates said light in an area which is offset by a predetermined number of unit areas on an inner side of a profile line of said cross-sectional shape data with respect to said unit areas overlapped with the profile line of said cross-sectional shape data on the surface of said light hardening resin;
        said scanning exposing means scans a center of said optical beam having a first diameter along a scanning line that is within the inner side of the profile line and offset by a predetermined distance from the profile line of said cross-sectional shape data; and
        said scanning exposing means scans an optical beam, having a second diameter which is shorter than said first diameter, within the inner side of the profile line of said cross-sectional shape data.

2. The optical shaping apparatus according to claim 1, wherein a shape of said unit area is a square; and
    wherein said first diameter is a value obtained by multiplying a length of one side of said unit area by the predetermined number of unit areas.

3. The optical shaping apparatus according to claim 2, wherein said predetermined distance in which said scanning line is offset from said profile line is equal to a value obtained by adding said second diameter to a half of said first diameter.

4. An optical shaping method for an optical shaping apparatus configured to irradiate light according to cross-sectional shape data of a three-dimensional model on a surface of a light hardening resin to form a hardening layer, and layering hardening layers to shape said three-dimensional model,
    wherein,
        said optical shaping apparatus includes:
            one-shot exposing unit configured to turn on/off irradiation of light onto the surface of said light hardening resin for each predetermined unit area, and irradiate light collectively on a plurality of said unit areas for which irradiation of light is on;
            scanning exposing means configured to irradiate an optical beam with a predetermined diameter, and scan said optical beam on the surface of said light hardening resin;
            a polarizing beam splitter configured to synthesize the light from the one-shot exposing means and the optical beam from the scanning exposing means; and
            an objective lens to receive light from the one-shot exposing unit and the optical beam from the polarizing beam splitter, the objective lens being configured to (a) image-form light from the one-shot exposing unit on the surface of said light hardening resin and (b) condense the optical beam from the scanning exposing means, said objective lens receiving light from the one-shot exposing unit before receiving the optical beam from the scanning exposing means, said one-shot exposing means including a condenser lens, said condenser lens and said objective lens comprise a symmetric optical system, said method comprises:
  causing said one-shot exposing unit to irradiate said light in an area which is offset by a predetermined number of unit areas on an inner side of a profile line of said cross-sectional shape data with respect to said unit areas overlapped with the profile line of said cross-sectional shape data on the surface of said light hardening resin;
  causing said scanning exposing unit to scan a center of said optical beam having a first diameter along a scanning line that is within an inner side of a profile line of said cross-sectional shape data and offset by a predetermined distance from the profile line of said cross-sectional shape data; and
  causing said scanning exposing unit to scan an optical beam, having a second diameter which is shorter than said first diameter, within the inner side of the profile line of said cross-sectional shape data.

5. An optical shaping apparatus configured to irradiate light according to cross-sectional shape data of a three-dimensional model on a surface of a light hardening resin to form a hardening layer, and layering hardening layers to shape said three-dimensional model, comprising:
  a one-shot exposing unit configured to turn on/off irradiation of light to the surface of said light hardening resin for each predetermined unit area, and irradiate light collectively on a plurality of said unit areas for which irradiation of light is on;
  a scanning exposing unit configured to irradiate an optical beam with a predetermined diameter, and scan said optical beam on the surface of said light hardening resin; and
  a polarizing beam splitter configured to synthesize the light from the one-shot exposing unit and the optical beam from the scanning exposing unit; and
  an objective lens to receive light from the one-shot exposing unit and the optical beam from the polarizing beam splitter, the objective lens being configured to (a) image-form light from the one-shot exposing unit on the surface of said light hardening resin and (b) condense the optical beam from the scanning exposing unit, said objective lens receiving light from the one-shot exposing unit before receiving the optical beam from the scanning exposing unit, wherein,
  said one-shot exposing means includes a condenser lens, said condenser lens and said objective lens comprise a symmetric optical system,
  said one-shot exposing unit is configured to irradiate said light in an area which is offset by a predetermined number of unit areas on an inner side of a profile line of said cross-sectional shape data with respect to said unit areas overlapped with the profile line of said cross-sectional shape data on the surface of said light hardening resin; and
  said scanning exposing unit is configured to scan a center said optical beam having a first diameter along a scanning line that is within the inner side and offset by a predetermined distance from the profile line of said cross-sectional shape data; and
  said scanning exposing unit is configured to scan an optical beam, having a second diameter which is shorter than said first diameter, within the inner side of the profile line of said cross-sectional shape data.

* * * * *